UNITED STATES PATENT OFFICE 2,129,663

ESTERS OF METHACRYLIC ACID

Harold J. Barrett, Wilmington, Del., assignor to E. I. du Pont de Nemours & Company, Wilmington, Del., a corporation of Delaware No Drawing. Application July 14, 1934, Serial No. 735,275

6 Claims. (Cl. 260—2)

The present invention relates to new materials, which are useful in the art, to esters of methacrylic acid, and more particularly to the esters of methacrylic acid with aliphatic monohydric saturated secondary alcohols.

An object of the present invention is to provide a new composition of matter and a process for its preparation. A further object of the invention is to provide a new polymerizable composition of matter together with a process for its polymerization. A still further object of the invention is to provide a process for the preparation of the methacrylic acid esters of the aliphatic monohydric saturated secondary alcohols, which may be obtained by the reaction of the secondary alcohol with a methacrylyl halide. Another object of the invention is to provide mixtures or interpolymers of the polymerized resin with other polymerizable compounds of methacrylic and acrylic acids. Other objects and advantages of the invention will hereinafter appear.

There have been prepared in accord with this invention valuable esters of methacrylic acid which have been found useful as prepared and even more valuable when polymerized. These compounds may be generally described as methacrylic acid esters of the alphatic monohydric saturated secondary alcohols such, for example, as dimethyl, methyl ethyl, diethyl, methyl propyl, ethyl propyl, ethyl isopropyl, dipropyl, diisopropyl, propyl butyl and equivalent carbinols which may be substituted or unsubstituted by halogen or other substituent group; the methacrylic acid esters of the higher secondary alcohols are likewise included as, for example, 3-methyl pentanol-2, 2-methyl pentanol-3, and in fact any secondary alcohol having the structural formula

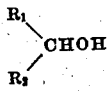

in which R₁ and R₂ may be similar or dissimilar alkyl, aryl, or aralkyl groups.

The following specific examples are furnished to illustrate methods of preparing my new compositions of matter but it will be understood that the invention is not limited to the details therein given.

*Example 1.*—Equimolar quantities of methacrylyl chloride and diisopropyl carbinol were mixed and the solution was warmed on a water bath under a reflux condenser at such a rate that hydrogen chloride was liberated vigorously. After the vigorous liberation of hydrogen chloride had ceased (usually after the solution had been heated on the boiling water bath for about one-half an hour) there was added 10 parts of hydroquinone to each 100 parts of methacrylyl chloride and heating on bath was continued about 20 minutes longer.

After cooling, the reaction mixture was dissolved in ether, and extracted with water and then with 5% sodium hydroxide solution until free from hydrochloric acid, inhibitor and unreacted diisopropyl carbinol. The cold reaction mixture was neutralized and then washed and dried over a suitable desiccating medium. The solvents were removed from the dried product by fractional distillation, and the ester finally separated by fractionation under reduced pressure. A 65% yield of di-isopropyl carbinol methacrylate was obtained. This ester had a boiling point of 72–75° C. at 9 mm., and a density at 20° C. of 0.876.

*Example 2.*—104 parts (parts are all by weight) of methacrylyl chloride and 74 parts of secondary butyl alcohol were mixed and the solution was warmed on a water bath under a reflux condenser at such a rate that hydrogen chloride was liberated vigorously. After the vigorous liberation of hydrogen chloride had ceased (usually after the solution had been heated on the boiling water bath for about one-half an hour) there was added 10 parts of hydroquinone to each 100 parts of methacrylyl chloride used and heating on bath was continued about 20 minutes longer.

After cooling, the reaction mixture was dissolved in ether, and extracted with water and then with 5% sodium hydroxide solution until free from hydrochloric acid, inhibitor and unreacted secondary butyl alcohol. The cold reaction mixture was neutralized and then washed and dried over a suitable desiccating medium. The solvents were removed from the dried product by fractional distillation, and the ester finally separated by fractionation under reduced pressure. A 45% yield of secondary butyl methacrylate was obtained. This ester had a boiling point of 53–57° C. at 18 mm., a density of 0.890 at 20° C., and a saponification number of 406.4,—theoretical 395.

The methacrylates, as prepared in accord with the examples, are usually mobile liquids, but may sometimes be solids. The esters as thus produced are monomeric and may be polymerized, according to the invention, by means of heat, light, and/or a catalyst, e. g., as described for the polymerization of organic vinyl esters in British specification 15,271/1914. Preferably a catalyst such as oxygen, ozone, an organic peroxide, an ozonide, etc., is employed. Other catalysts which may be used include aluminum sulfate, boron fluoride, the mineral acids, e. g., hydrochloric and sulfuric acids as well as the organic acids, for example, acetic, and methacrylic acids, etc., as well as the anhydrides and acid halides of such organic acids, metal salts of fatty acids and resinic acids, e. g., cobalt linoleate and resinate, manganese oleate and rosin, etc. The polymerization may be effected in the presence or absence of a solvent for both monomer and polymer, or in the presence of a solvent for the monomer and a non-solvent for the polymer, or the monomer may be emulsified and then polymerized. Preferably polymerization is carried out at a moderate temperature, i. e., between 60–100° C., altho higher temperatures, such as, for example, 130° C., or higher, may be employed. The polymerization reaction is usually strongly exothermic and it may be necessary to control the temperature by cooling devices, tho polymerization may be carried out in apparatus which may or may not be provided with condensing devices, or in suitable pressure equipment.

As indicated, various methods may be employed for polymerizing the monomeric esters of methacrylic acid and it has been found that the properties of the resins, the physical properties to a large extent and the chemical properties to a lesser extent, are altered considerably by the type of polymerizing process utilized. The process described in the copending applications of D. E. Strain, Ser. Nos. 668,080 filed April 26, 1933, and 704,753 filed Dec. 30, 1933, may be used, if desired.

Methods illustrating the polymerization of the esters will now be described, but it will be understood that other suitable polymerizing processes may be employed.

*Example 3.*—40 parts (parts are given by weight) of diisopropyl methacrylate monomer was dissolved in 250 parts of methanol in a bottle provided with a stopper, then 0.4 part of powdered benzoyl peroxide was added to this solution. After the benzoyl peroxide was all dissolved, 80 parts of water, insufficient to cause permanent turbidity, was added. The bottle was securely closed and set in an oven at approximately 65° C. After the polymerization was complete in approximately 18 days, the mixture was allowed to cool. The liquid was decanted. The resin was removed from the bottle, was cut into small pieces, and dried in a vacuum desiccator. A 60% yield of a white, semi-fused, brittle resin was obtained, soluble in butyl acetate, gasoline, and toluene, relatively insoluble in acetone. The resin was placed in a disk shaped mold in which it was subjected to a temperature of 100° C. and a pressure of approximately 5,000 pounds per square inch for approximately 15 minutes. A molded clear, colorless, and very brittle disk was obtained which softened at a temperature of 60° C. A 5% solution in toluene had a viscosity at 25° C. of 0.01 poise.

*Example 4.*—The polymerization process of Example 3 was repeated using 44 parts of secondary butyl methacrylate monomer, 300 parts of methanol, 0.4 part of benzoyl peroxide, and 60 parts of water. After 2 days at 65° C. an 89% yield of the polymerized ester was obtained as a semi-fused mass which could be readily ground to a powder. The resin was soluble in butyl acetate, gasoline, acetone, and toluene, had a viscosity of 0.018 poise (5% solution in toluene at 25° C.), and was compatible with nitrocellulose. The compatibility with nitrocellulose was determined by dissolving an equal volume of a 5% toluene solution of the polymerized ester in a solution consisting of 20 parts of nitrocellulose and 380 parts of butyl acetate. The resulting solution was spread on a glass plate and allowed to dry at room temperature. The resin was placed in a disk shaped mold in which it was subjected to a temperature of 100° C. and a pressure of approximately 5,000 pounds per square inch for approximately 15 minutes. A molded water clear disk was obtained which softened at a temperature of 62° C.

Valuable products may be obtained by utilizing the polymers of the esters described herein together with equivalents or homologues thereof admixed with other polymeric acrylic or methacrylic esters or other derivatives. Especially valuable products result if the monomeric esters are mixed prior to their polymerization; by this method interpolymers having a wide range of characteristics are made. Due to the unique characteristics of methyl methacrylate polymer, which is a hard resin having a high melting point, its admixture with the polymeric esters of methacrylic acids herein described or interpolymers thereof are particularly well adapted for many uses.

The esters of methacrylic acid as well as mixtures or interpolymers thereof with other polymerizable compounds are particularly well suited for thermoplastic molding. The monomer may be polymerized and/or preformed prior to placing in the mold and then may be molded in accord with the usual procedural steps employed particularly in the molding of methyl methacrylate as described in the Rowland-Hill Patent 1,980,483, of November 13, 1934. The mold preferably is hot, prior to the introduction of the polymerization product, is then closed and the material so confined heated and pressed, the temperatures ranging from approximately 80–150° C., and pressures from 200 pounds per square inch upward are usually sufficient to give a suitably molded product. The presence or absence of plasticizers will, of course, alter considerably the molding conditions and it is usually advantageous to have present plasticizers to alter the physical characteristics of the resulting product to fit the particular need for which the molded article is to be used.

The masses resulting from polymerization can immediately (i. e., in the states they have been obtained) be made into useful articles. It is possible to obtain the required articles if, for instance, the polymerization be carried out while the initial material is in a suitable mold, for instance, one of steel or glass, so that the articles, for example, umbrella handles, fountain pen barrels, buttons, and the like, are obtained directly from the mold. Or, if desired, the masses may be worked to the required shape by softening with suitable softeners or plasticizers in the presence of volatile solvents and, after shaping, evaporating the solvent.

The polymerization products may be worked into the required shapes in various ways, for example, they can be softened and kneaded, rolled, compressed, drawn into wires, threads, or the like, or the masses can be mixed with additional substance, and rolled into plates, or films, or they may be pressed into the required shapes such as buttons, combs, and the like.

The solid masses can be worked by cutting, sawing, filing, or the like, whether they be obtained directly by polymerization, or after special treatment of the polymerized masses. These shaped articles may be polished, and parts connected together by smearing the faces to be connected with a suitable solvent, such as acetone, epichlorhydrin, or the corresponding methacrylic acid ester.

The polymerization product dissolved in a suitable solvent which may or may not be the monomer may be transformed into a useful article, e. g., films, by casting and then evaporating the solvent, or by extruding thru a suitable orifice into a precipitating bath or drying atmosphere. The polymer may be recovered from such solutions by precipitation with a suitable non-solvent for the polymer.

The properties of the resulting masses may be widely varied by modification with plasticizers, e. g., dibutyl phthalate, tricresyl phosphate, etc., drying, semi-drying, and non-drying oils, synthetic and natural resins, waxes, bitumens, cellulose derivatives, e. g., cellulose nitrate and ethyl cellulose, etc., pigments, fillers, and dyes, etc. Thus, it is possible to produce, instead of hard glass-like masses, also soft and flexible masses. Likewise, by the addition of suitable coloring means, it is possible to produce masses, or objects, having any desired color effects. The incorporation of the additions can be effected either before, or during, the polymerizing process, or the additions can be made to the already formed polymerization products in a suitable condition.

If the polymerization of an organic methacrylic acid ester be carried out in an incomplete manner, a syrupy solution of the polymerization product containing some unchanged methacrylic acid ester is obtained. This product can be utilized either directly or along with other solvents or diluents for the production of substances to be used for coating, painting, or impregnating purposes. If, for instance, a porous substance such as wood, paper, textile fabric, artificial stone, or the like be coated with the said syrupy solution or be impregnated therewith, very resistant coating and impregnations are obtained on completing the polymerization of the coating, painting, or impregnation, for instance by exposing the article to artificial or natural light, or by heating it, or by employing both light and heat. In this case a portion of the unchanged methacrylic acid ester in the syrupy solution may or may not be evaporated while another portion may be converted into the solid polymerization product. The articles thus treated have imparted to them a very high resistance to external influences, e. g., resistance to water, acids, alkalis, and atmospheric changes.

The said syrupy mass can be mixed with comminuted matter, such, for instance, as ground cork, or ground wood, fibrous substances, mineral fillers, or the like, and the mixture be made into the proper shape and the unchanged methacrylic acid esters in the articles be converted, by suitable polymerization, into the solid final product.

It is also possible to start from solid, semi-solid, or plastic polymerization products of the methacrylic acid esters, these being softened by heating them by themselves or with suitable solvents, and using them in their softened state. On cooling or on the evaporation of the diluent, that may still be present, the product is converted into the solid lacquer form.

It is obvious that mixtures of various polymerized methacrylic acid esters can be used for lacquering, painting, or impregnating in accordance with this invention. It is likewise obvious that the wholly, or partly polymerized esters can be mixed with suitable additional substances to modify the properties of the lacquering, painting, or impregnating materials in any desired manner. As additions of this kind we mention oils (such, for instance, as castor oil), dyes, powdered substances (such as zinc oxide), camphor, camphor substitutes, and the like.

In accordance with this invention it is possible to obtain valuable products if the said polymers be dissolved, or softened, in suitable solvents and then be converted again to the solid state. The products thus obtained may be used for purposes for which cellulose esters have hitherto been used, namely as substitutes for horn, amber, artificial resins, lacquers, for impregnation purposes, and also for the production of films, interlayer for safety glass, pressure adhesives, artificial threads, and the like.

The products thus formed have the advantage over products made from nitrocellulose in being slow burning and odorless. By the addition of suitable agents, the strength and hardness of the products may be modified within wide limits so that it is possible to manufacture both hard, horn-like substances and soft and more pliable products. The products may also be modified by varying the conditions of the polymerization.

The monomer may be polymerized in the presence of a solvent and the solution used as such or the polymer recovered from the solution by evaporation or precipitation methods. In many cases, however, it is more profitable to use an amount of solvent insufficient to produce a freely flowing solution, so that soft plastic masses are obtained which can be pressed, kneaded, rolled, or drawn into shape, or formed into blocks, plates, or films.

Plasticizers or other modifying agents may be added to the monomer prior to polymerization or directly to the polymerized product, it being generally desirable to employ a plasticizer which is soluble in the polymer and the monomer, although it is not essential that the dual solubility characteristics be present. Thus, plasticizers or softening agents, such, for example, as camphor, phthalates, such as ethyl, propyl, isopropyl, butyl, isobutyl, cyclohexyl, methyl cyclohexyl, or benzyl phthalate, or phthalates of the mixed type such as cyclohexyl butyl, benzyl butyl or butyl lauryl phthalate; esters of other dibasic acids, such as the ethyl, propyl, isopropyl, butyl, isobutyl, cyclohexyl, methyl cyclohexyl or benzyl esters of succinic, fumaric, tartaric, adipic, and sebacic acids; esters of monobasic acids, such as the butyl, isobutyl, cyclohexyl, methyl cyclohexyl, benzyl or lauryl esters of lauric, laevulinic, benzoic, benzoyl proprionic and benzoyl benzoic acids; esters of polyhydric alcohols, e. g., glycol and glycerol, such as glycol benzoate, glycol laevulinate, triacetin, tripropionin and tributyrin; substituted toluene sulphonamides, such as ethyl paratoluene sulphonamide; substituted amides, such as tetrabutyl succinamide, tetrabutyl adipamide, tetrabutyl phthalamide; hydrocarbons, such as dixylyl ethane; halogenated hydrocarbons, such as chlorinated diphenyls and dichlordibenzyl; ether compounds, such as dicresoxyethyl ether; and drying, non-drying or semi-drying oils, such as castor oil, cotton seed oil, linseed oil, and the like. These additions also facilitate later mechanical treatment, as cutting, sawing, and polishing.

The polymerized esters, mixtures of the polymerized esters with dissimilar polymerizable esters or other polymerizable compounds of methacrylic or acrylic acids or vinyl compounds; or interpolymers of the esters with such other compounds may be used advantageously as safety glass interlayers. These polymerized esters, mixtures thereof, or interpolymers thereof may be plasticized or otherwise modified as desired. The compositions may be compounded with glass in an unpolymerized, partially polymerized, or completely polymerized condition. When compounding the safety glass with the unpolymerized or partially polymerized compositions, the polymerization may be effected by subjecting the sandwich of glass and compound to suitable application of light and/or heat.

From a consideration of the above specification it will be realized that various changes may be made in the process or product without departing from the invention or sacrificing any of its advantages.

I claim:

1. A process for the polymerization of an ester of an aliphatic monohydric secondary alcohol which comprises heating the alkyl methacrylate monomer dissolved in methanol containing benzoyl peroxide and water to a temperature of approximately 65° C. and holding it at that temperature until polymerization is substantially complete.

2. The polymeric methacrylic acid ester of an aliphatic monohydric sectionary alcohol prepared by polymerizing the monomeric ester in accord with the process of claim 1.

3. The polymeric diisopropyl carbinol methacrylate prepared by polymerizing the monomeric ester in accord with the process of claim 1.

4. The polymeric secondary butyl methacrylate prepared by polymerizing the monomeric ester in accord with the process of claim 1.

5. The molding composition comprising the polymeric methacrylic acid ester of an aliphatic monohydric secondary alcohol prepared by polymerizing the monomeric ester in accord with the process of claim 1.

6. The interpolymer of a methacrylic acid ester of an aliphatic monohydric secondary alcohol and a polymerizable derivative of an acid selected from the group consisting of acrylic acid and methacrylic acid, which interpolymer is prepared by polymerizing a mixture of the monomeric compounds in accord with the process of claim 1.

HAROLD J. BARRETT.